(12) United States Patent
Hopt et al.

(10) Patent No.: US 8,006,907 B2
(45) Date of Patent: Aug. 30, 2011

(54) CARD READER WITH LOCKING DEVICE

(75) Inventors: Juergen Hopt, Rottweil (DE);
Karl-Rudolf Hopt, Rottweil (DE)

(73) Assignee: ddm hopt +schuler GmbH & Co. KG, Rottweil (DE)

( * ) Notice: Subject to any disclaimer, the term of this patent is extended or adjusted under 35 U.S.C. 154(b) by 653 days.

(21) Appl. No.: 11/919,264

(22) PCT Filed: Apr. 28, 2006

(86) PCT No.: PCT/DE2006/000738
§ 371 (c)(1),
(2), (4) Date: Sep. 15, 2008

(87) PCT Pub. No.: WO2006/116973
PCT Pub. Date: Nov. 9, 2006

(65) Prior Publication Data
US 2009/0152360 A1    Jun. 18, 2009

(30) Foreign Application Priority Data
Apr. 29, 2005    (DE) .......................... 10 2005 020 436

(51) Int. Cl.
*G06K 7/00*    (2006.01)

(52) U.S. Cl. ....................................... 235/486; 235/492

(58) Field of Classification Search ................... 235/486, 235/475, 492, 487, 479
See application file for complete search history.

(56) References Cited

U.S. PATENT DOCUMENTS

| 5,196,687 A * | 3/1993 | Sugino et al. ................. 235/483 |
| 5,879,175 A | 3/1999 | Muramatsu et al. |
| 7,175,085 B2 * | 2/2007 | Oguchi ......................... 235/451 |
| 2009/0152360 A1* | 6/2009 | Hopt et al. .................... 235/486 |

FOREIGN PATENT DOCUMENTS

| DE | 44 02 229 A1 | 7/1995 |
| DE | 442 28 276 A1 | 2/1996 |
| DE | 200 17 507 U1 | 12/2000 |
| DE | 200 17 501 U1 | 1/2001 |
| DE | 10258189 A1 | 8/2004 |
| EP | 1462981 B1 | 9/2004 |

\* cited by examiner

*Primary Examiner* — Thien M Le
(74) *Attorney, Agent, or Firm* — Walter A. Hackler

(57) ABSTRACT

In accordance with the invention, in a card reader comprising a pivot arm that engages behind an inserted card, a locking element that can be displaced in the insertion direction of the card and, in a locking position, blocks a pivoting motion of the pivot arm out of the engaging pivot position, a toothed wheel which is driven by a pinion and on which the locking element eccentrically engages, and at least one stop face that cooperates with the card reader for limiting the rotation of the toothed wheel, the at least one stop face is provided on the pinion.

4 Claims, 2 Drawing Sheets

CARD READER WITH LOCKING DEVICE

BACKGROUND OF THE INVENTION

The present invention relates to a card reader comprising a pivot arm that engages behind an inserted card, a locking element that can be displaced in the insertion direction of the card and, in a locking position, blocks a pivoting motion of the pivot arm out of the engaging pivot position, a toothed wheel which is driven by a pinion and on which the locking element eccentrically engages, and at least one stop face that cooperates with the card reader housing, for limiting the rotation of the toothed wheel.

In conventional card readers, the inserted card is locked in the card reader by means of a pivot arm in order to prevent the user from withdrawing the inserted card e.g. during data exchange. The pivot arm is pivoted into the card path behind the inserted card and is locked in this locking position by means of a displaceable locking element. After release of the motor-driven locking, the pivot arm pivots out of the card path, and the user can remove the card. A rotary drive is provided for displacing the locking element and comprises a toothed wheel which is driven by a motor pinion and on which the locking element eccentrically engages. Two stop faces are provided on the toothed wheel, which limit the rotation of the toothed wheel in both directions of rotation and consequently define the locking position and the open position of the locking element. This conventional limitation of rotation, however, causes great wear of the stop faces which limits the service life of the toothed wheel or the drive.

In contrast thereto, it is the underlying purpose of the present invention to considerably increase the service life of the drive of a card reader of the above-mentioned type.

SUMMARY OF THE INVENTION

This object is achieved in accordance with the invention in a surprisingly simple fashion in that the at least one stop face is provided on the pinion.

The service life is more than multiplied by the inventive arrangement of the stop face(s) directly on the pinion. Wear of the toothed wheel or pinion is no longer detectable.

Two stop faces are preferably provided on the pinion, each of which limits the rotation of the toothed wheel in one direction of rotation. The pinion and the stop face or each stop face may advantageously be formed in one piece, in particular, as an injection-molded plastic part.

Further advantageous embodiments of the invention are the subject matter of the dependent claims.

Further advantages of the invention can be extracted from the description and the drawing. The features mentioned above and below may be used individually or collectively in arbitrary combination. The embodiment shown and described is not to be understood as an exhaustive enumeration but has exemplary character for describing the invention.

DESCRIPTION OF THE PREFERRED EMBODIMENT

Figure 1:
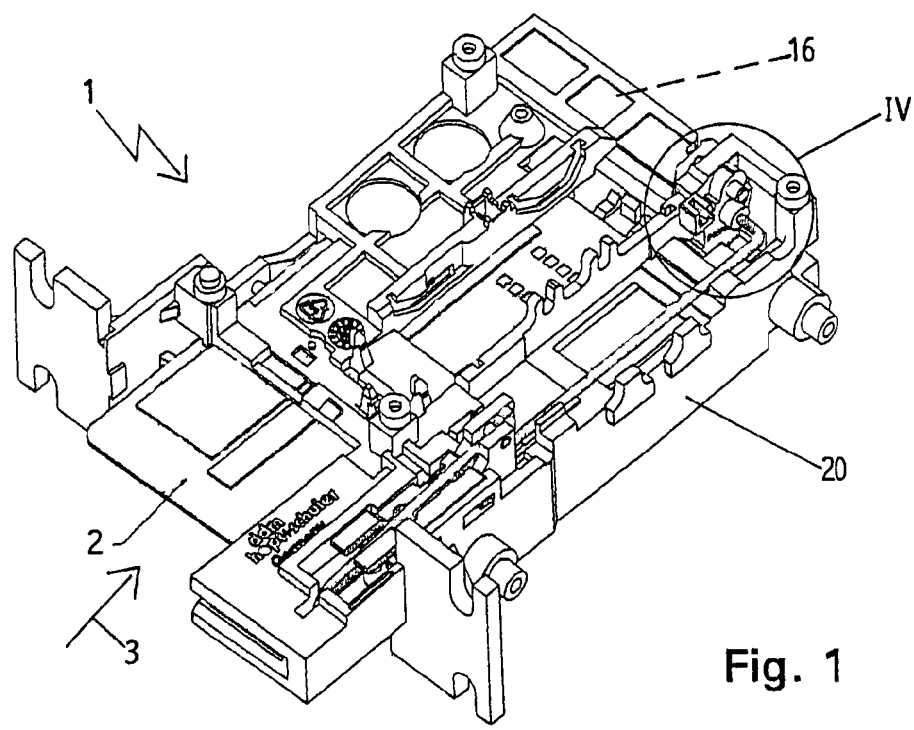
FIG. 1 shows a perspective view of the inventive card reader with a pivot arm that engages behind an inserted card in a locking fashion, and with a locking element that locks the pivot arm.

In FIG. 1, a so-called push/pull card reader is designated with reference numeral 1, wherein a user inserts a card 2 in the insertion direction 3 into the card reader 1 to its data exchange position until it abuts a card stop (not shown), and removes it again from the card reader 1 after data exchange.

Figure 2:
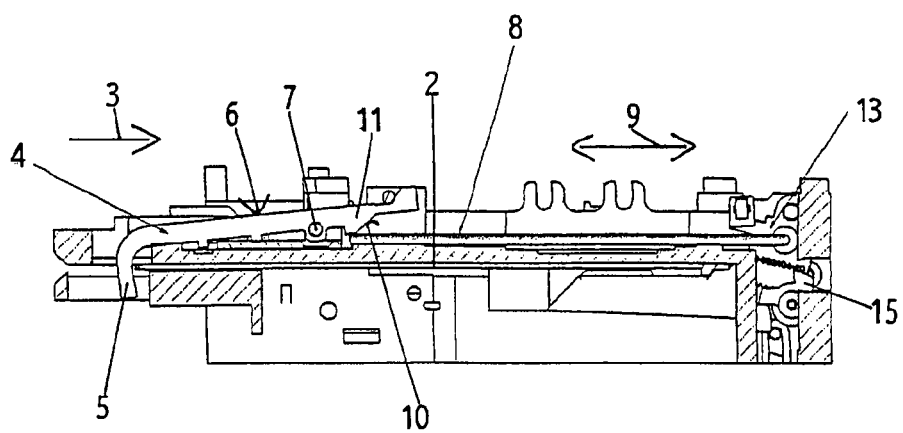
FIG. 2 shows a side view of the card reader with the pivot arm being in its locking position in which it engages in the card path.

In order to prevent withdrawal of the inserted card 2 by the user, e.g. during data exchange, the inserted card 2 is locked in the card reader 1 by a pivot arm 4 whose claw-shaped free end 5 engages behind the inserted card 2 into the card path (FIG. 2). The pivot arm 4 is formed by one arm of a two-armed lever 6 whose pivot axis is designated with 7. The pivot arm 4 is pretensioned by a spring (not shown) into its pivot position which releases the card path, and is actuated by a pin- or rod-shaped locking element 8 which can be moved forward and backward in the insertion direction 3 as indicated by the double arrow 9.

Figure 3:
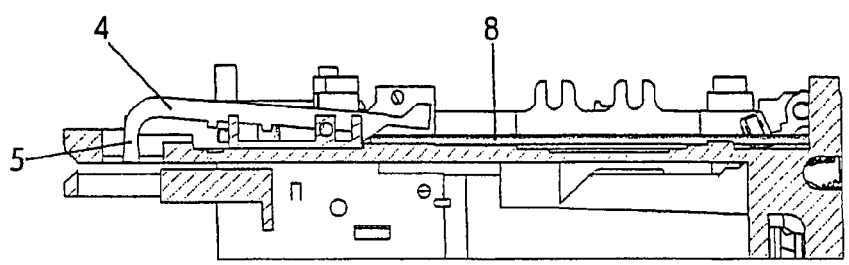
FIG. 3 shows the side view of the card reader with the pivot arm being in its open position in which it is pivoted out of the card path.

In order to pivot the pivot arm 4 into its locking position in which it engages in the card path, the locking element 8 is pushed forward opposite to the insertion direction 3 when the card 2 has been inserted into the card reader 1, until one end thereof runs up an inclined surface 10 of the other arm 11 of the two-armed lever 6, which engages in its motion path. The two-armed lever 6 is deflected in an anti-clockwise direction, thereby pivoting the claw-shaped end 5 of the pivot arm 4 behind the inserted card 2 into the card path, thereby locking the inserted card 2. The locking element 8 blocks a pivoting motion of the pivot arm 4 out of the engaging pivot position. When the locking element 8 is withdrawn in the insertion direction 3, due to the pretension, the pivot arm 4 pivots back into its open pivot position in which the card path is free, and the user can remove the card 2. FIG. 3 shows the card reader 1 which is ready for insertion of a card 2, with the pivot arm 4 being in its open position in which it is pivoted out of the card path.

Figure 4A:
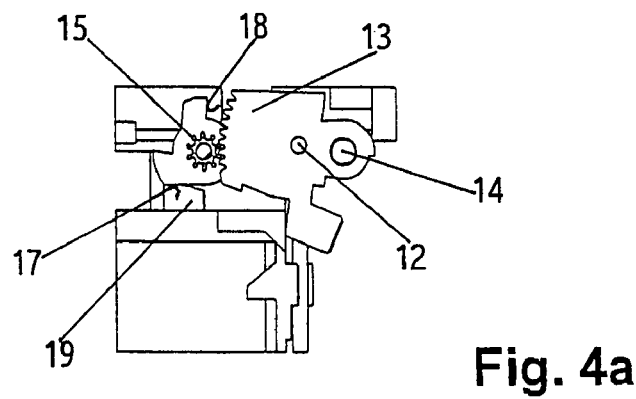
FIGS. 4a and 4b show detailed views in accordance with IV of FIG. 1 of the drive for the locking element in a drive position (FIG. 4a) corresponding to FIG. 3, and a second drive position (FIG. 4b) corresponding to FIG. 2.
Figure 4B:
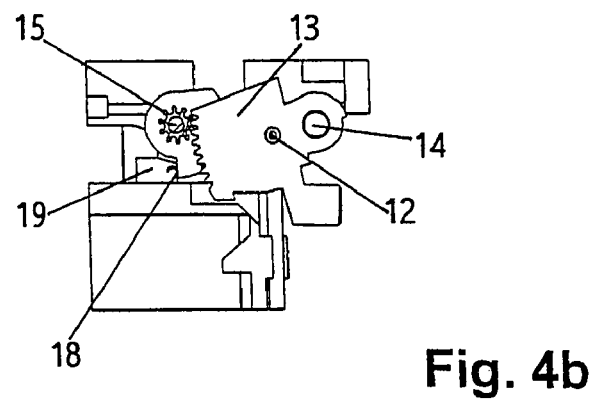

As is shown in FIG. 4, the other end of the locking element 8 is disposed at 12 in a toothed wheel 13 (axis of rotation 14) which is only designed as a toothed ring in this case, and which is driven by a pinion 15 of a motor 16 indicated in FIG. 1. The pinion 15 has two stop faces 17, 18 which limit the rotary motion of the pinion 15 in both directions of rotation, and consequently define the closed and the open position of the locking element 8. The first stop face 17 of the pinion 15 abuts a housing projection 19 of the card reader housing 20 (FIG. 1) in the open position of the locking element 8, as shown in FIG. 4a. The second stop face 18 of the pinion 15 abuts the housing projection 19 in the closed position of the locking element 8, as shown in FIG. 4b. In the illustrated embodiment, the angle between the two stop faces 17, 18, and thus the angle of rotation of the pinion 15, is 270°.

Figure 5:
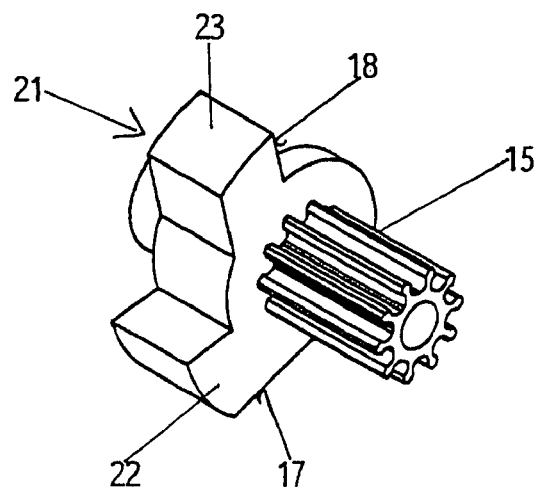
FIG. 5 shows a toothed wheel of the drive of FIG. 4.

As is illustrated in FIG. 5, the pinion 15 and the two stop faces 17, 18 are designed in one piece as an injection molded plastic part 21. The two stop faces 17, 18 are provided axially next to the pinion 15 on two projections 22, 23, which radially project past the pinion 15.

We claim:
1. Card reader according comprising:
a housing;
a pivot arm that engages behind an inserted card;
a locking element displaceable in an insertion direction of the card, and, in a locking position, blocks a pivoting motion of the pivot arm out of the engaging pivot position;
a toothed wheel driven by a pinion and eccentrically engagable the locking element; and
two stop faces provided on the pinion for limiting rotation of the toothed wheel, at least one stop face being provided on the pinion and each stop face limiting the rotation of the toothed wheel in one direction of rotation.

2. Card reader according to claim 1 wherein each stop face is provided axially next to the pinion.

3. Card reader according to claim 1 wherein the pinion and the stop faces are formed in one piece.

4. Card reader according to claim 1 wherein the pivot arm is formed by one arm of a two-armed lever with another arm of the two-armed lever cooperating with the locking.

* * * * *